(12) United States Patent
Shih et al.

(10) Patent No.: US 10,598,930 B2
(45) Date of Patent: Mar. 24, 2020

(54) MULTI-EYEBOX HEAD-UP DISPLAY DEVICE AND MULTILAYER COMBINER

(71) Applicant: AUTOMOTIVE RESEARCH & TESTING CENTER, Changhua County (TW)

(72) Inventors: Chun-Yao Shih, Changhua County (TW); Cheng-Chieh Tseng, Changhua County (TW); Yi-Cheng Chen, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 0 days.

(21) Appl. No.: 15/826,981

(22) Filed: Nov. 30, 2017

(65) Prior Publication Data

US 2019/0162957 A1 May 30, 2019

(51) Int. Cl.
*G02B 27/01* (2006.01)
*B60K 35/00* (2006.01)
*G02B 27/14* (2006.01)

(52) U.S. Cl.
CPC .......... *G02B 27/0101* (2013.01); *B60K 35/00* (2013.01); *G02B 27/0149* (2013.01); *G02B 27/142* (2013.01); *B60K 2370/31* (2019.05); *B60K 2370/334* (2019.05); *B60K 2370/347* (2019.05); *B60K 2370/77* (2019.05);
(Continued)

(58) Field of Classification Search
CPC ........ G02B 27/01–0198; G02B 5/0816; G02B 5/10; G02B 27/0189; G02B 27/0075; G02B 2027/0181; G02B 2027/0194; G02B 2027/0196; G02B 2027/0198; G02B 2027/0185; G02B 2027/0179; G02B 2027/0136; G02B 2027/013; G02B 2027/0123; H04N 9/3147; B32B 17/10036; B32B 17/10568
See application file for complete search history.

(56) References Cited

U.S. PATENT DOCUMENTS 10,088,685 B1 * 10/2018 Aharoni ............. G02B 27/0172
2015/0103408 A1 * 4/2015 Nishima ................ B60K 35/00
359/618

(Continued)

*Primary Examiner* — Cara E Rakowski
*Assistant Examiner* — Christopher A Lamb, II
(74) *Attorney, Agent, or Firm* — Rosenberg, Klein & Lee

(57) ABSTRACT

A multi-eyebox head-up display device and a multilayer combiner are disclosed. The device comprises a projector generates a projected image to a reflector. The reflector generates a reflected image to a multilayer combiner. The multilayer combiner includes at least two superimposed imaging plates, and the semi-reflective surfaces of the superimposed imaging plates are tilted to each other. While the reflected image is projected to the semi-reflective surface of the topmost superimposed imaging plate, the semi-reflective surface of the topmost superimposed imaging plate generates a virtual image. Simultaneously, the reflected image penetrates through the topmost superimposed imaging plate and reaches the lower superimposed imaging plate, and the semi-reflective surface of the lower superimposed imaging plate reflects the light to generate another virtual image. The present invention enables the driver to view the vehicular information at different viewing angles.

17 Claims, 6 Drawing Sheets

(52) U.S. Cl.
CPC ............... *G02B 2027/0159* (2013.01); *G02B 2027/0169* (2013.01); *G02B 2027/0194* (2013.01)

(56) References Cited

U.S. PATENT DOCUMENTS

| | | | |
|---|---|---|---|
| 2015/0212323 A1* | 7/2015 | Kobayashi | B60K 35/00 359/630 |
| 2016/0070099 A1* | 3/2016 | Inomata | G02B 5/02 359/631 |
| 2017/0123212 A1* | 5/2017 | Kawakami | G02B 13/16 |
| 2018/0267308 A1* | 9/2018 | Sadakane | B32B 17/10568 |

* cited by examiner

MULTI-EYEBOX HEAD-UP DISPLAY DEVICE AND MULTILAYER COMBINER

BACKGROUND OF THE INVENTION

Field of the Invention

The present invention relates to a head-up display device, particularly to a multi-eyebox head-up display device and a multilayer combiner.

Description of the Related Art

The head-up display (HUD) device is an instrument originally used in aircrafts. Literally implied by its name, the head-up display device enables a pilot to view important information in a head-up gesture without bending his head. Considering the convenience and safety provided by the HUD device, some manufacturers have equipped their vehicles with the HUD devices, whereby the drivers can drive more conveniently and safely.

Owing to persistent development, the current HUD device not only can present speed, tire pressure and navigation information but also can recognize traffic barriers, such as vehicles, motorcycles, pedestrians, etc. No matter what function a HUD device has achieved, the optical path structure is always the focus in the development of the HUD device, for example, how to use a smallest-sized optical structure to generate a large, long-distance, and clear virtual image. Although a fine optical structure can generate clear virtual images, it can only project the virtual images to the eyebox at a fixed position in common design. Thus, the driver can only view the information presented on the eyebox from a limited range of viewing position and angles.

The current HUD device can only project virtual images onto a single eyebox. It implies that the driver cannot exactly view the images projected by the HUD device unless his head is within a specified range of positions. Once the driver moves his body or tilts his head, or while the vehicle is driven by a driver having different stature, the optical structure of the HUD device must be adjusted to make the eyebox appear in an appropriate position. Therefore, the narrow projection area of the current HUD device limits the freedom of the driver and inconveniences the driver very much.

Accordingly, the present invention proposes a multi-eyebox head-up display device and a multilayer combiner, wherein a multilayer combiner is used to generate a multi-eyebox effect, whereby is overcome the problems of the conventional technology.

SUMMARY OF THE INVENTION

The primary objective of the present invention is to provide a multi-eyebox head-up display device and a multilayer combiner, which can project multiple eyeboxes to enable the driver to view the projected vehicular information from different angles and enable the drivers respectively having different heights to view the projected vehicular information, whereby to increase driving convenience and driving safety.

Another objective of the present invention is to provide a multi-eyebox head-up display device and a multilayer combiner, which exempts the driver from adjusting the angle of the eyebox projected by the projection device while the driver changes his viewing angle to the eyebox or while the vehicle is driven by another driver needing a different altitude of the eyebox, whereby to increase the convenience of application.

A further objective of the present invention is to provide a multi-eyebox head-up display device and a multilayer combiner, which has a simple structure and a low fabrication cost, whereby to increase the fabrication efficiency.

To achieve the abovementioned objectives, the present invention proposes a multi-eyebox head-up display device, which comprises a projector, a reflector, and a multilayer combiner. The projector generates a projected image to the reflector. The reflector generates a reflected image to the multilayer combiner. The multilayer combiner reflects the light to form a plurality of virtual images. The multilayer combiner includes at least two superimposed imaging plates. The superimposed imaging plates are stacked together. The semi-reflective surface of one superimposed imaging plate is tilted with respect to the semi-reflective surface of the adjacent superimposed imaging plate. While the reflected image is projected to the semi-reflective surface of the topmost superimposed imaging plate, the semi-reflective surface of the topmost superimposed imaging plate generates a virtual image. Simultaneously, the reflected image penetrates through the topmost superimposed imaging plate and reaches the lower superimposed imaging plate. The reflected image can further penetrate through the lower superimposed imaging plate. The semi-reflective surface of the lower superimposed imaging plate reflects the light to generate another virtual image. Thereby, at least two virtual images appear in different eyeboxes.

The present invention also proposes a multilayer combiner applying to a multi-eyebox head-up display device. The multilayer combiner receives a reflected image and generates at least two virtual images to different eyeboxes. The multilayer combiner includes at least two superimposed imaging plates. The superimposed imaging plates are stacked together. The semi-reflective surface of one superimposed imaging plate is tilted with respect to the semi-reflective surface of the adjacent superimposed imaging plate. While the reflected image is projected to the semi-reflective surface of the topmost superimposed imaging plate, the semi-reflective surface of the topmost superimposed imaging plate generates a virtual image. Simultaneously, the reflected image penetrates through the topmost superimposed imaging plate and reaches the lower superimposed imaging plate. The reflected image can further penetrate through the lower superimposed imaging plate. The semi-reflective surface of the lower superimposed imaging plate reflects the light to generate another virtual image. Thereby, at least two virtual images appear in different eyeboxes.

In one embodiment, the semi-reflective surface of one superimposed imaging plate is tilted with respect to the semi-reflective surface of the adjacent superimposed imaging plate by an angle of 0.5-10 degrees; the transmission rate of the superimposed imaging plate is about 10-90%.

Below, embodiments are described in detail in cooperation with the attached drawings to make easily understood the objectives, technical contents, characteristics and accomplishments of the present invention.

DETAILED DESCRIPTION OF THE INVENTION

The multi-eyebox head-up display device of the present invention provides several eyeboxes to enable the driver to view the image generated by the device from different viewing angles, whereby the driver can view the vehicular information comfortably.

Figure 1:
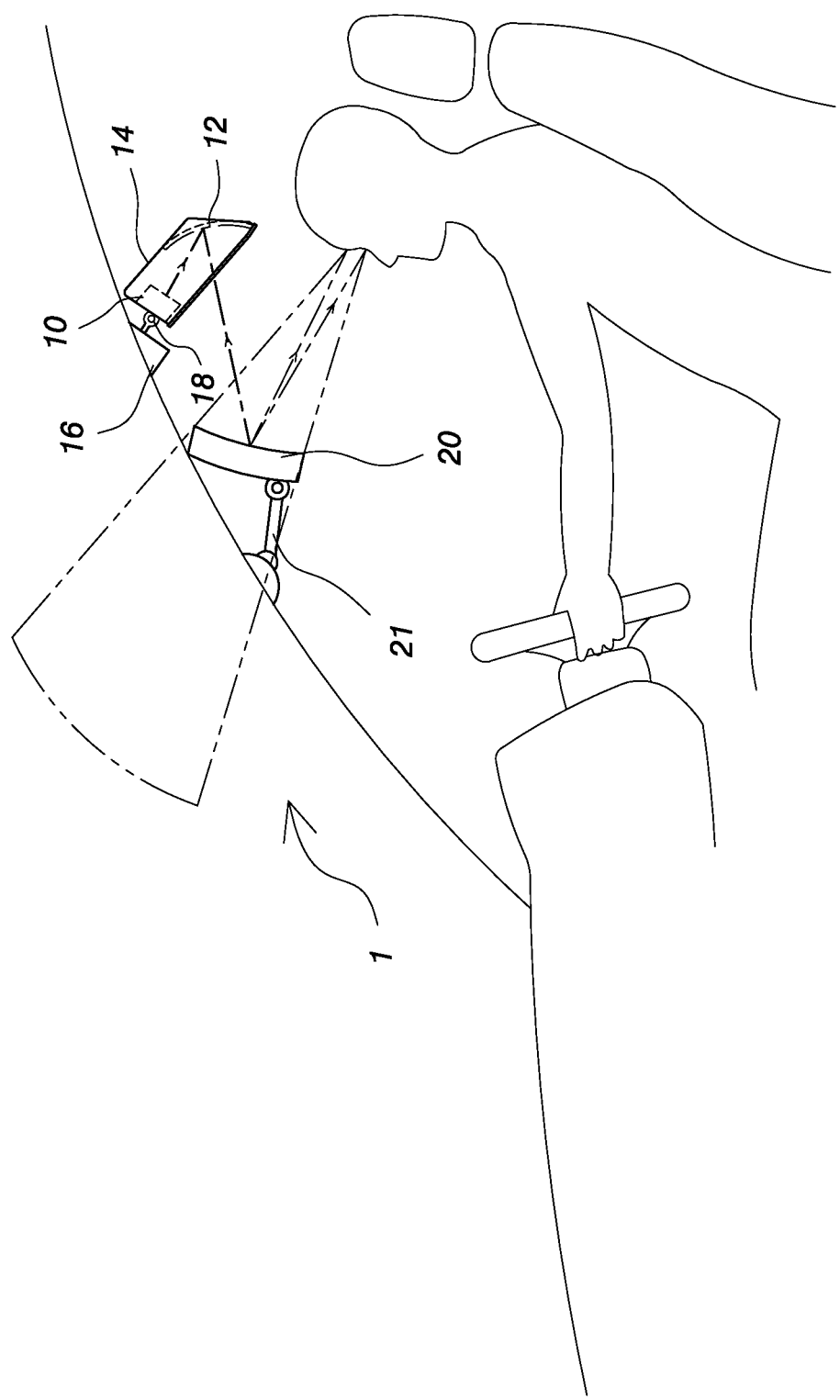
FIG. 1 is a diagram schematically showing a multi-eyebox head-up display device installed in a vehicle according to one embodiment of the present invention.

Refer to FIG. 1 schematically showing the space where the multi-eyebox head-up display device is installed and the structure thereof according to one embodiment of the present invention. In this embodiment, the multi-eyebox head-up display device 1 is disposed before the driver's seat, enabling the driver to view the vehicular information in a head-up posture. In this embodiment, the multi-eyebox head-up display device 1 comprises a projector 10 and a reflector 12. The projector 10 may be a display device or a projection device, which can generate image sources. The projector 10 generates high-brightness images. The reflector 12 is normally a concave reflective mirror able to generate a magnified image. The projector 10 and the reflector 12 are encased and secured by a housing 14. The projector 10 is disposed in a way making the surface of the projector 10, which projects image, face the reflective surface of the reflector 12. A mount brace 16 is disposed on the external surface of the housing 14. The housing 14, together with the projector 10 and the reflector 12 there inside, is mounted onto the windshield of the vehicle. The mount brace 16 is connected with the housing 14 through a pivot joint 18, whereby the housing 14 can be rotated with respect to the mount brace 16 to adjust the angle by which the reflector 12 reflects the images.

Figure 2A:
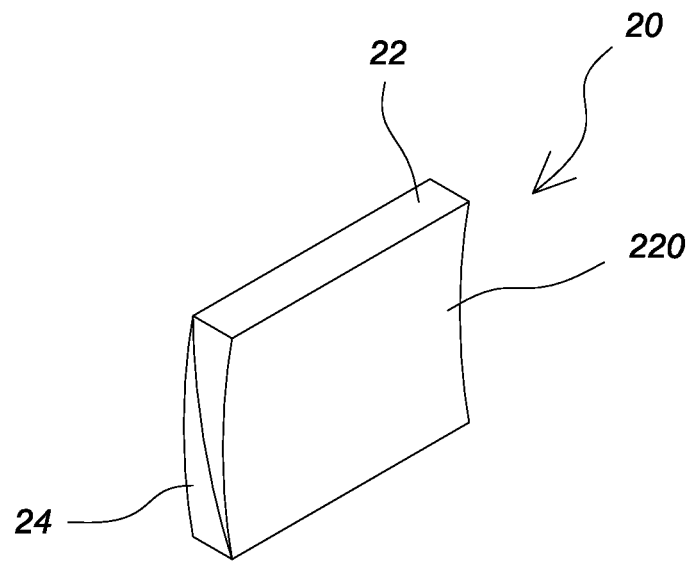
FIG. 2a is a perspective view schematically showing assembled superimposed imaging plates of a multilayer combiner according to one embodiment of the present invention.
Figure 2B:
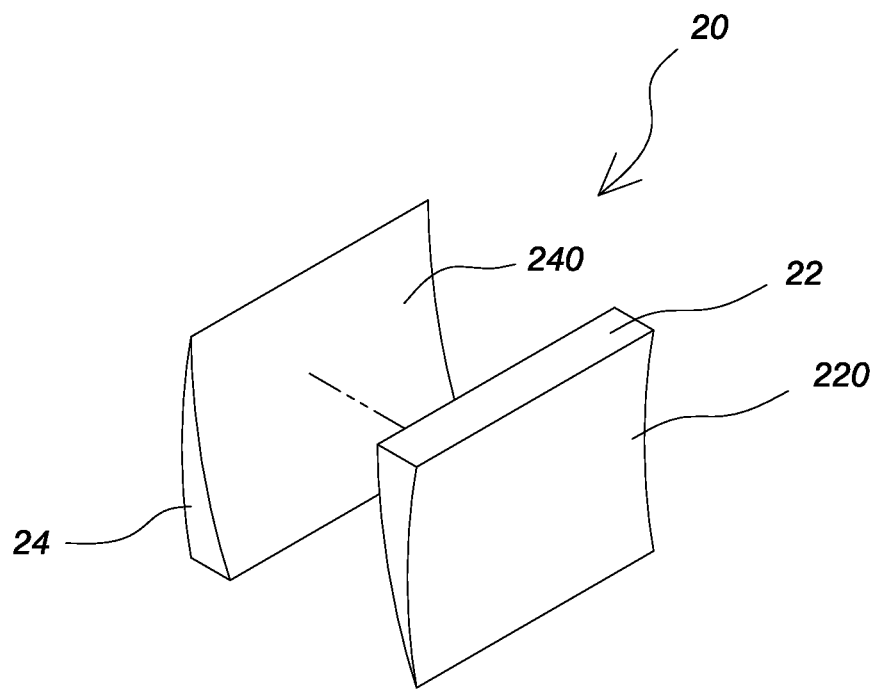
FIG. 2b is an exploded view schematically showing superimposed imaging plates of a multilayer combiner according to one embodiment of the present invention.

Refer to FIG. 1 again, and refer to FIG. 2a and FIG. 2b. The multi-eyebox head-up display device 1 further comprises a multilayer combiner 20. In this embodiment, the multilayer combiner 20 is a multilayer concave combiner. The multilayer combiner 20 includes at least two superimposed imaging plates 22 and 24 and a fixing brace 21 encasing and securing the two superimposed imaging plates 22 and 24. Through the fixing brace 21, the multilayer combiner 20 can be mounted onto the windshield of the vehicle for receiving the images reflected by the reflector 12.

Refer to FIG. 2a and FIG. 2b. In this embodiment, two superimposed imaging plates 22 and 24 are adopted. The two superimposed imaging plates 22 and 24 respectively have semi-reflective surfaces 220 and 240 on the surfaces thereof. Each of the two superimposed imaging plates 22 and 24 has a transmission rate of 10-90%. In this embodiment, the transmission rate is 70%. However, the transmission rate may be modified according to requirement. The two superimposed imaging plates 22 and 24 of the multilayer combiner 20 are stacked together. The semi-reflective surface 220 of the superimposed imaging plate 22 is tilted with respect to the semi-reflective surface 240 of the adjacent superimposed imaging plate 24 by an included angle X, wherein the included angle X ranges from 0.5 to 10 degrees. In this embodiment, the included angle X is 4.5 degrees. The included angle X of 4.5 degrees is only an example. The present invention does not limit that the included angle X must have a specified value. In the present invention, the included angle X may be modified according to requirement.

Figure 3:
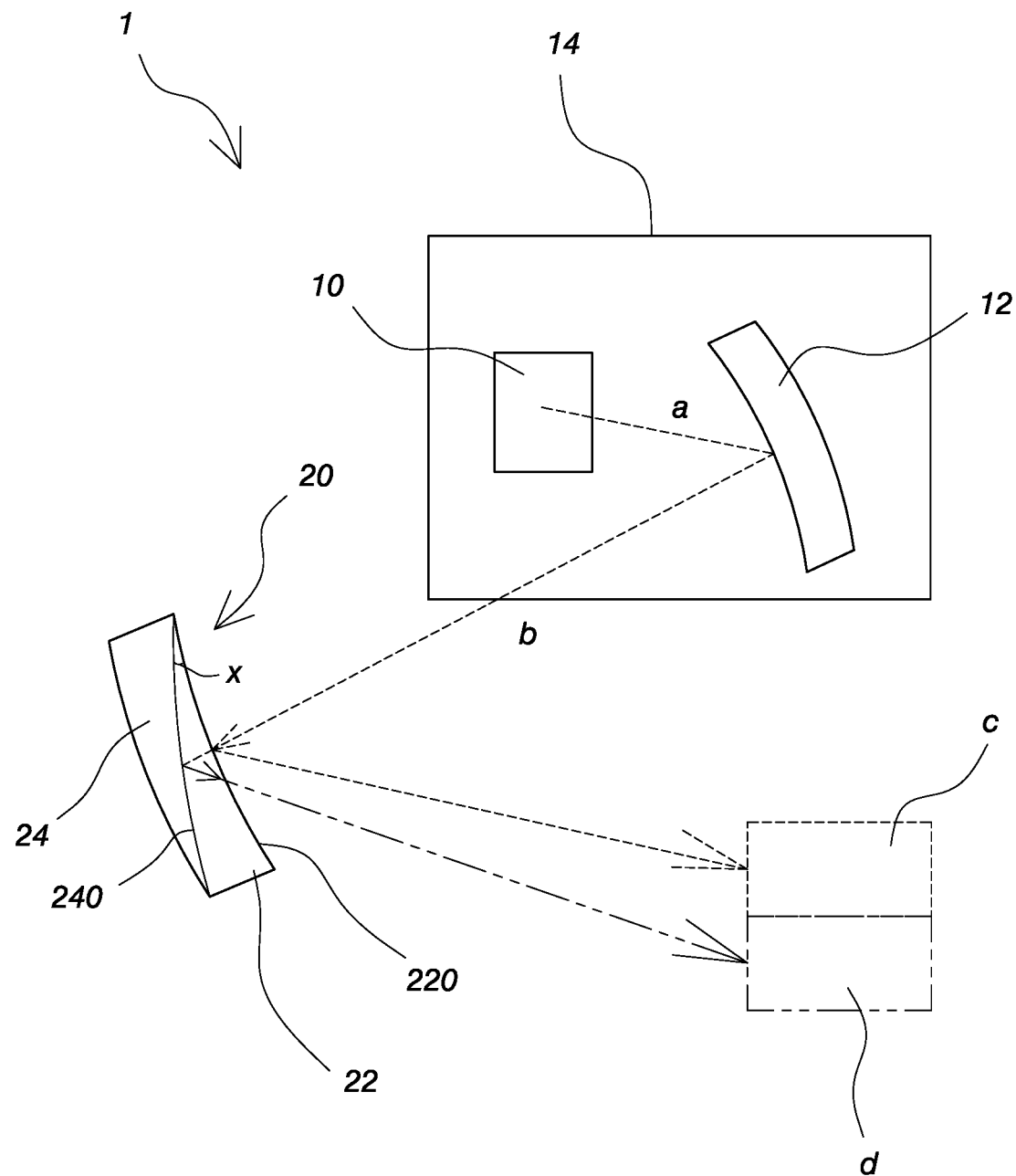
FIG. 3 is a diagram schematically showing an optical path of a multi-eyebox head-up display device according to one embodiment of the present invention.

After the description of the disposition and components of the multi-eyebox head-up display device 1, the optical path for generating virtual images will be described in detail below. Refer to FIG. 3. The projector 10 generates a projected image a to the reflector 12. After receiving the projected image a, the reflector 12 generates a reflected image b. The reflected image b is projected to the semi-reflective surface 220 of the topmost superimposed imaging plate 22. The semi-reflective surface 220 undertakes reflection and generates a virtual image c. The area of the virtual image c is 90 cm×60 cm, which is the most comfortable vision area for human beings. At the same time, the reflected image b penetrates through the topmost superimposed imaging plate 22 and reaches the semi-reflective surface 240 of the lower superimposed imaging plate 24. The semi-reflective surface 240 undertakes reflection and generates a virtual image d. The area of the virtual image d also has an area of 90 cm×60 cm. Via special design of the multilayer combiner 20, the multi-eyebox head-up display device 1 of the present invention can generate two virtual images c and d in two different eyeboxes. In driving, the driver may bend forward to operate the switches on the instrument panel, turn his head to observe something, or lean his head on the pillow of the driver seat for rest. In such cases, the posture and the viewing angle of the driver are changed. In the present invention, the driver needn't maintain a specified posture to view the vehicular information but can still view the vehicular information from another viewing angle while his posture is changed. Therefore, the present invention can increase the comfort of the driver effectively.

Figure 4:
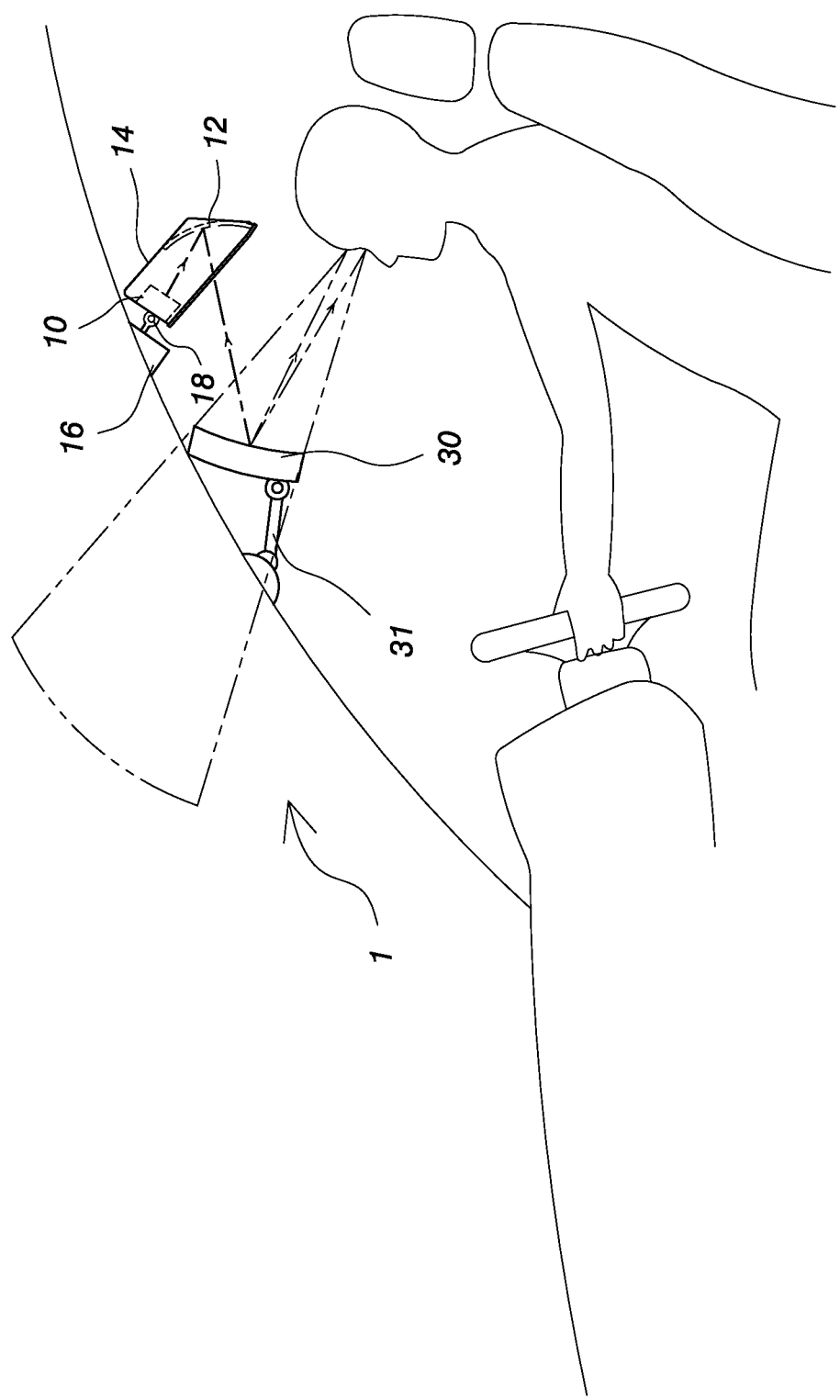
FIG. 4 is a diagram schematically showing a multi-eyebox head-up display device installed in a vehicle according to another embodiment of the present invention.
Figure 5A:
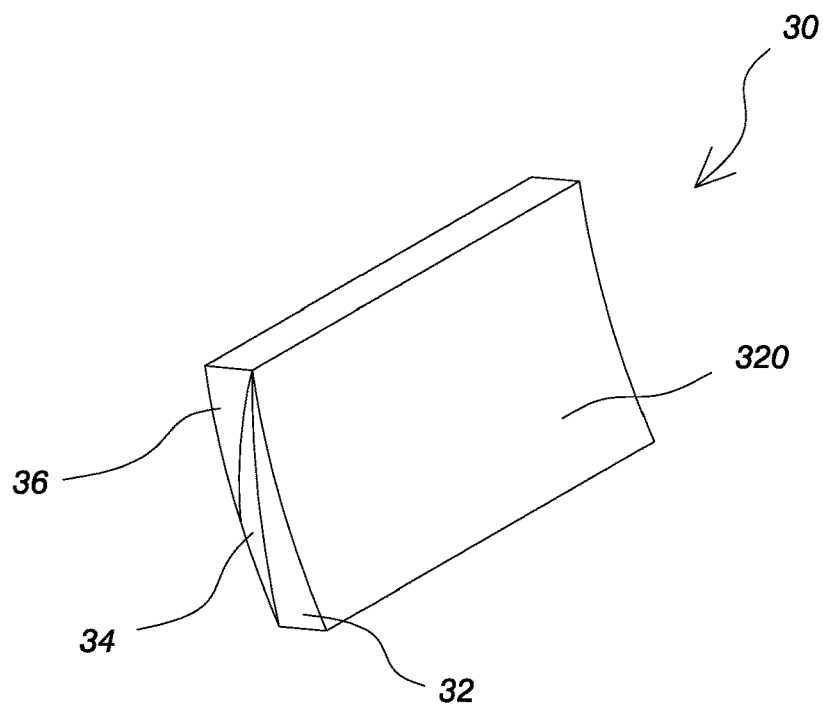
FIG. 5a is a perspective view schematically showing assembled superimposed imaging plates of a multilayer combiner according to another embodiment of the present invention.
Figure 5B:
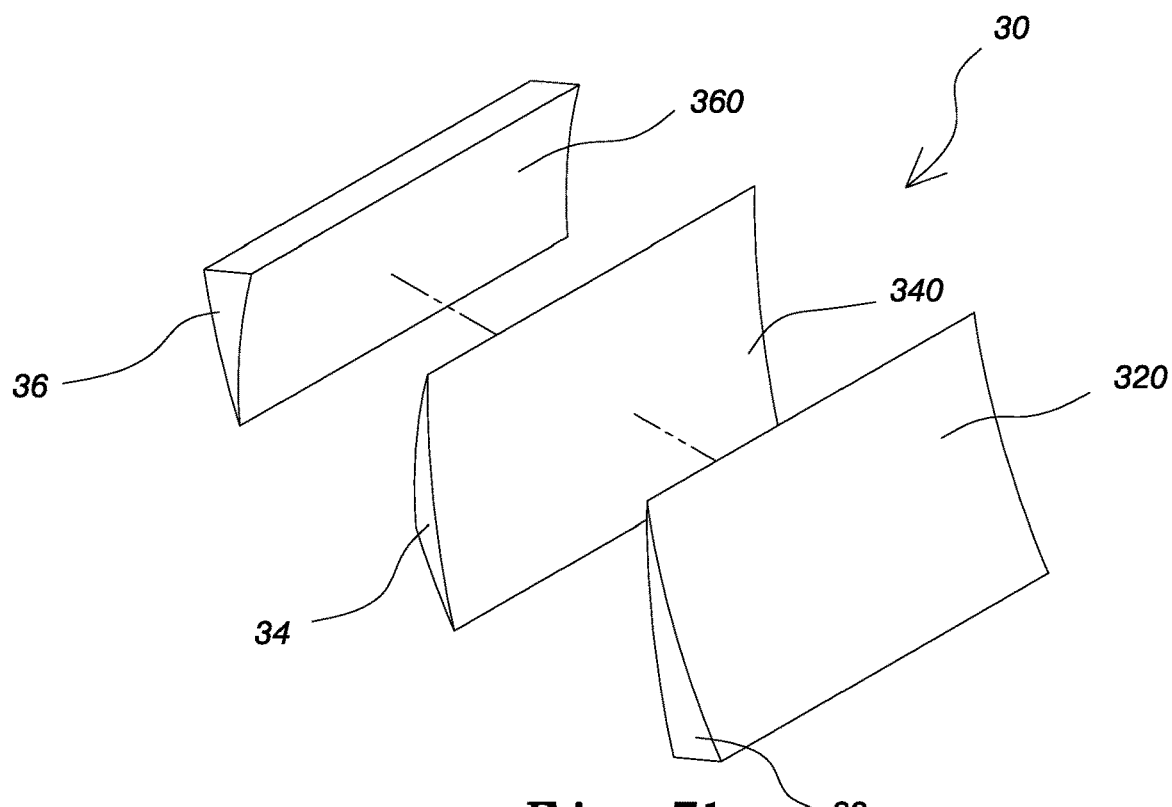
FIG. 5b is an exploded view schematically showing superimposed imaging plates of a multilayer combiner according to another embodiment of the present invention.

Refer to FIG. 4, FIG. 5a and FIG. 5b. In one embodiment, the multilayer combiner of the multi-eyebox head-up display device of the present invention contains more than two superimposed imaging plates. In this embodiment, the dispositions and structures of the projector 10, the reflector 12 and the housing 14 are identical to those in the abovementioned embodiment and will not repeat herein. This embodiment is different from the abovementioned embodiment in that the multilayer combiner 30 of this embodiment contains three superimposed imaging plates 32, 34 and 36. In this embodiment, the three superimposed imaging plates 32, 34 and 36 of the multilayer combiner 30 are also encased and secured by a fixing brace 31 and mounted onto the windshield through the fixing brace 31. Refer to FIG. 5a and FIG. 5b for the detailed structure of the multilayer combiner 30 of this embodiment. The multilayer combiner 30 is also a concave reflective combiner. The multilayer combiner 30 contains three superimposed imaging plates 32, 34 and 36.

The three superimposed imaging plates 32, 34 and 36 are stacked together. The three superimposed imaging plates 32, 34 and 36 respectively have semi-reflective surfaces 320, 340, 360. The semi-reflective surface 320, 340 or 360 of each of the three superimposed imaging plates 32, 34 and 36 is tilted with respect to the semi-reflective surfaces 320, 340 or 360 of the adjacent superimposed imaging plate 32, 34 or 36. In detail, the semi-reflective surface 340 of the superimposed imaging plate 34 is tilted with respect to the semi-reflective surface 320 of the superimposed imaging plate 32; the semi-reflective surface 360 of the superimposed imaging plate 36 is tilted with respect to the semi-reflective surface 340 of the superimposed imaging plate 34. In this embodiment, each of the semi-reflective surfaces 320, 340 and 360 of the superimposed imaging plates 32, 34 and 36 is tilted with respect to the semi-reflective surface 320, 340 or 360 of the adjacent superimposed imaging plate 32, 34 or 36 by an included angle X or X', wherein the included angle X or X' ranges from 0.5 to 10 degrees. In this embodiment, the included angle X or X' is 4.5 degrees.

Figure 6:
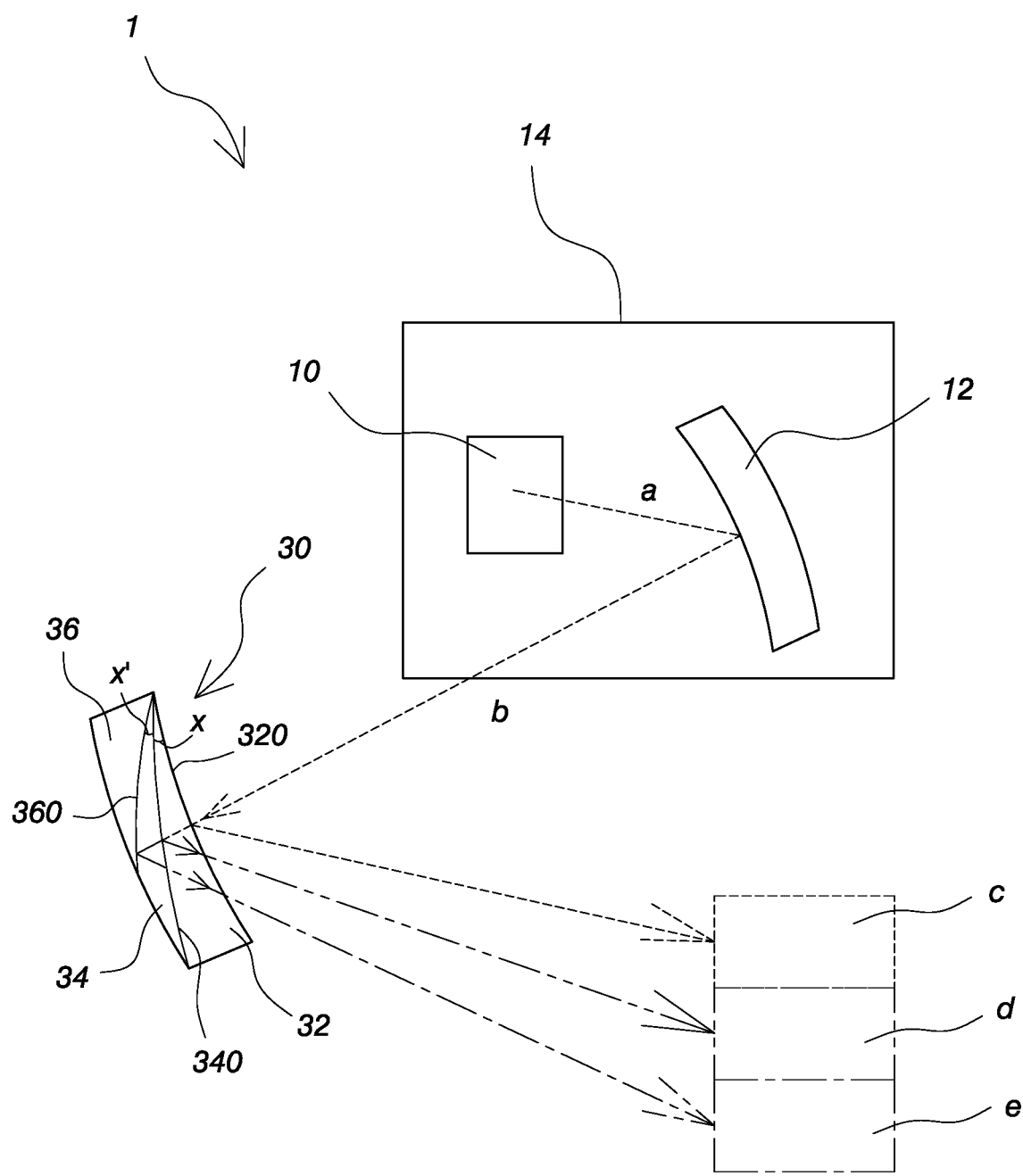
FIG. 6 is a diagram schematically showing an optical path of a multi-eyebox head-up display device according to another embodiment of the present invention.

Refer to FIG. 6 for the optical path of the multi-eyebox head-up display device of this embodiment. The projector 10 generates a projected image a to the reflector 12. After receiving the projected image a, the reflector 12 generates a reflected image b. The reflected image b is projected to the topmost layer of the multilayer combiner 30, i.e. the semi-reflective surface 320 of the first-layer superimposed imaging plate 32. The semi-reflective surface 320 undertakes reflection and generates a first virtual image c. At the same time, the reflected image b penetrates through the first-layer superimposed imaging plate 32 and reaches the semi-reflective surface 340 of the second-layer superimposed imaging plate 34. The semi-reflective surface 340 of the second-layer superimposed imaging plate 34 undertakes reflection and generates a second virtual image d. At the same time, the reflected image b penetrates through the second-layer superimposed imaging plate 32 and reaches the semi-reflective surface 360 of the third-layer superimposed imaging plate 36. The semi-reflective surface 360 of the third-layer superimposed imaging plate 36 undertakes reflection and generates a third virtual image e. From the above description, it is learned: the multilayer combiner 30 of this embodiment can project three virtual images c, d, and e to three different eyeboxes. Thereby, the driver can view the vehicular information, which is projected by the multi-eyebox head-up display device, from several different viewing angles. Therefore, the present invention enables the driver to change his posture more flexibly and drive the vehicle more comfortably.

In conclusion, the present invention can project virtual images to different eyeboxes, facilitating the driver to view the projected vehicular information from different altitudes or different viewing angles. Therefore, the driver needn't move the head-up display device to adjust the position and angle of the eyebox while the viewing angle of the driver to one of the eyeboxes is changed. Therefore, the present invention can effectively improve the convenience and safety of using a head-up display device. Further, the present invention has simple structure and low fabrication cost and thus can increase the fabrication efficiency.

The embodiments described above are only to exemplify the present invention but not to limit the scope of the present invention. Any equivalent modification or variation according to the spirit or characteristics of the present invention is to be also included within the scope of the present invention.

What is claimed is:

1. A multi-eyebox head-up display device comprising:
a projector generating a projected image;
a reflector receiving said projected image and generating a reflected image;
a multilayer combiner receiving said reflected image and including at least two superimposed imaging plates seamlessly stacked together, wherein a semi-reflective surface of one said superimposed imaging plate is tilted with respect to a semi-reflective surface of one adjacent said superimposed imaging surface, and wherein said reflected image is projected to said semi-reflective surface of a topmost one of said superimposed imaging plates and reflected to generate a virtual image, and wherein said reflected image penetrates through said topmost one of said superimposed imaging plates to reach a lower one of said superimposed imaging plates, and wherein said reflected image further penetrates through said lower one of said superimposed imaging plates, and wherein said reflected image is reflected by said semi-reflective surface of said lower one of said superimposed imaging plates to generate another virtual image, whereby at least two offset virtual images are presented in different eyeboxes, said semi-reflective surface of one said superimposed imaging plate is tilted with respect to said semi-reflective surface of one adjacent said superimposed imaging surface by an angle of 0.5-10 degrees, the semi-reflective surfaces of the multilayer combiner are arc concave surfaces, at least one of the semi-reflective surfaces of the at least two superimposed imaging plates is located between the at least two superimposed imaging plates, the semi-reflective surface of each of the at least two superimposed imaging plates has a first edge and a second edge, the first edge is opposite to the second edge, the first edge of the topmost one of the at least two superimposed imaging plates is connected with the first edge of the lower one of the at least two superimposed imaging plates, and the second edge of the topmost one of the at least two superimposed imaging plates separates from the second edge of the lower one of the at least two superimposed imaging plates.

2. The multi-eyebox head-up display device according to claim 1 further comprising a housing encasing and securing said projector and said reflector, wherein a surface of said housing has a mount brace enabling said housing to be mounted onto an object.

3. The multi-eyebox head-up display device according to claim 2, wherein said mount brace further includes a pivot joint connected with said housing and enabling said housing to be rotated with respect to said mount brace for adjusting an emitting angle of said reflected image.

4. The multi-eyebox head-up display device according to claim 1, wherein said multilayer combiner is a concave multilayer combiner.

5. The multi-eyebox head-up display device according to claim 1, wherein each said superimposed imaging plate has a transmission rate of 10-90%.

6. The multi-eyebox head-up display device according to claim 1, wherein said projector is a display device.

7. The multi-eyebox head-up display device according to claim 1, wherein said reflector is a concave reflective mirror.

8. The multi-eyebox head-up display device according to claim 1, wherein said multilayer combiner further comprises a fixing brace encasing and securing said superimposed imaging plates and enabling said superimposed imaging plates to be mounted onto an object.

9. A multilayer combiner for a multi-eyebox head-up display device, wherein said multilayer combiner receives a reflected image and reflects said reflected image to generate at least two virtual images in different eyeboxes, and wherein said multilayer combiner comprises at least two superimposed imaging plates seamlessly stacked together, and wherein a semi-reflective surface of one said superimposed imaging plate is tilted with respect to a semi-reflective surface of one adjacent said superimposed imaging surface, and wherein said reflected image is projected to said semi-reflective surface of a topmost one of said superimposed imaging plates and reflected to generate a virtual image, and wherein said reflected image penetrates through said topmost one of said superimposed imaging plates to reach a lower one of said superimposed imaging plates, and wherein said reflected image further penetrates through said lower one of said superimposed imaging plates, and wherein said reflected image is reflected by said semi-reflective surface of said lower one of said superimposed imaging plates to generate another virtual image, whereby at least two offset virtual images are presented in different eyeboxes, said semi-reflective surface of one said superimposed imaging plate is tilted with respect to said semi-reflective surface of one adjacent said superimposed imaging surface by an angle of 0.5-10 degrees, the semi-reflective surfaces of the multilayer combiner are arc concave surfaces, at least one of the semi-reflective surfaces of the at least two superimposed imaging plates is located between the at least two superimposed imaging plates, the semi-reflective surface of each of the at least two superimposed imaging plates has a first edge and a second edge, the first edge is opposite to the second edge, the first edge of the topmost one of the at least two superimposed imaging plates is connected with the first edge of the lower one of the at least two superimposed imaging plates, and the second edge of the topmost one of the at least two superimposed imaging plates separates from the second edge of the lower one of the at least two superimposed imaging plates.

10. The multilayer combiner for a multi-eyebox head-up display device according to claim 9, wherein said multilayer combiner is a concave multilayer combiner.

11. The multilayer combiner for a multi-eyebox head-up display device according to claim 9, wherein each said superimposed imaging plate has a transmission rate of 10-90%.

12. The multilayer combiner for a multi-eyebox head-up display device according to claim 9, wherein said multilayer combiner is encased and secured by a fixing brace and is mounted onto an object by said fixing brace.

13. The multilayer combiner for a multi-eyebox head-up display device according to claim 9, wherein said reflected image is generated by a reflector, and wherein said reflector receives a projected image generated by a projector and reflects said projected image to generate said reflected image.

14. The multilayer combiner for a multi-eyebox head-up display device according to claim 13, wherein said projector and said reflector are encased and secured by a housing, and wherein a surface of said housing has a mount brace enabling said housing to be mounted onto an object.

15. The multilayer combiner for a multi-eyebox head-up display device according to claim 14, wherein said mount brace further includes a pivot joint connected with said housing and enabling said housing to be rotated with respect to said mount brace for adjusting an emitting angle of said reflected image.

16. The multilayer combiner for a multi-eyebox head-up display device according to claim 13, wherein said projector is a display device.

17. The multilayer combiner for a multi-eyebox head-up display device according to claim 13, wherein said reflector is a concave reflective mirror.

* * * * *